United States Patent Office 3,655,666
Patented Apr. 11, 1972

3,655,666
2,4-DI-(4-ARYLPIPERAZINO)-3-PENTANONES
FOR TREATING SCHISTOSOMIASIS
Herschel D. Porter, Indianapolis, Ind., assignor to Eli
 Lilly and Company, Indianapolis, Ind.
No Drawing. Original application Nov. 24, 1969, Ser. No.
 879,631. Divided and this application Mar. 5, 1971, Ser.
 No. 121,543
Int. Cl. C07d 51/70
U.S. Cl. 260—268 PH         1 Claim

ABSTRACT OF THE DISCLOSURE 2,4-di-(4-arylpiperazino)-3-pentanones represented by the formula

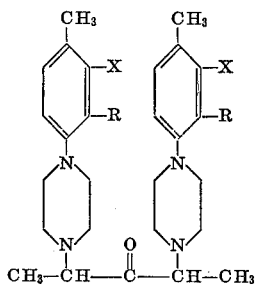

wherein X is halo, and R is hydrogen or methyl. The compounds of this invention are useful for the treatment of schistosomiasis.

BACKGROUND OF THE INVENTION

This is a division of U.S. Ser. No. 879,631, filed Nov. 24, 1969. This invention relates to novel compounds useful for the treatment of schistosomiasis. More particularly, this invention relates to 2,4-di(4-arylpiperazino)-3-pentanones and to methods for the treatment of schistosomiasis therewith.

Schistosomiasis is a seriously debilitating and frequently fatal parasitic infection caused by organisms of the genus Schistosoma. The parasitic organism which causes the infection undergoes a rather complex life cycle which requires a suitable species of snail as an intermediate host. The disease is extremely widespread and is endemic wherever the required snail intermediate is found. Schistosomiasis is an extremely serious world health problem and is considered by most authorities to be as great a problem as malaria with respect to the number of victims claimed.

At present, no satisfactory method of chemotherapy exists for the mass treatment of schistosomiasis. Parenteral injections of various derivatives of antimony have been employed, but such treatment suffers from several disadvantages. The doses required approach toxic levels, with the result that frequent, and often serious, side, effects accompany treatment. Furthermore, the necessity for parenteral administration imposes limitations upon the use of such compounds for mass therapy. Attempts to provide orally active drugs which do not contain antimony have met with only limited success.

U.S. Pat. No. 3,203,858 provided novel bis-β-(4-arylpiperazino)ethyl sulfones which are useful in the treatment of schistosomiasis. However, the compounds were found to have infrequent, but serious, side effects in humans. Thus the search for non-toxic chemotherapeutic agents continues.

SUMMARY

This invention provides novel 2,4-di-(4-arylpiperazino)-3-pentanones represented by the formula

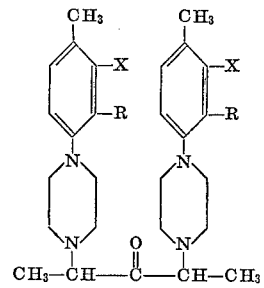

wherein X is halo (chloro, fluoro, bromo, or iodo), and R is hydrogen or methyl, and the pharmaceutically acceptable acid addition salts thereof. The compounds are useful in treating schistosomiasis in humans and animals when from 10 to 1000 mg./kg. of host body weight is administered daily. Accordingly, it is an object of this invention to provide compounds for the treatment of schistosomiasis which do not contain antimony. A further object of the invention is to provide antischistosomal drugs free of the undesirable side effects possessed by the currently employed therapeutic agents. Still another object is to provide such drugs which are orally effective. These and other objects of the invention will be more fully understood from the following description and claim.

DESCRIPTION OF PREFERRED EMBODIMENTS

The 2,4-di(4-arylpiperazino)-3-pentanones of this invention are represented by the formula

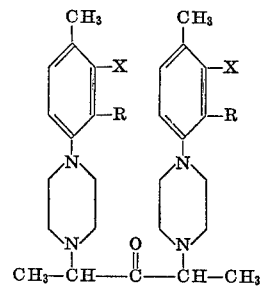

wherein X is halo and R is hydrogen or methyl, or the pharmaceutically acceptable acid addition salts thereof.

The term "halo," as used herein, includes chloro, fluoro, bromo, or iodo.

The term "acid addition salts" refers to salts prepared by reacting the free amine with an organic or inorganic acid. Representative salts include the hydrochloride, hydrobromide, sulfate, bisulfate, acetate, valerate, oleate, laurate, borate, benzoate, lactate, phosphate, tosylate, citrate, maleate, fumarate, succinate, tartrate, napsylate (salt of 2-naphthalenesulfonic acid), and the like.

The novel 2,4 - di-(4-arylpiperazino)-3-pentanones of this invention are conveniently prepared by reacting the appropriate n-arylpiperazine with a suitable haloalkylated ketone.

Illustrative compounds which can be prepared by the above procedure and which are included within the scope of this invention are:

2,4-di-(4-[3-chloro-4-methylphenyl]piperazino)-3-
 pentanone
2,4-di-(4-[3-bromo-4-methylphenyl]piperazino)-3-
 pentanone 2,4-di-(4-[3-iodo-4-methylphenyl]piperazino)-3-pentanone 2,4-di-(4-[3-fluoro-4-methylphenyl]piperazino)-3-pentanone 2,4-di-(4-[3-chloro-2,4-dimethylphenyl]piperazino)-3-pentanone 2,4-di-(4-[3-bromo-2,4-dimethylphenyl]piperazino)-3-pentanone 2,4-di-(4-[3-iodo-2,4-dimethylphenyl]piperazino)-3-pentanone 2,4-di-(4-[3-fluoro-2,4-dimethylphenyl]piperazino)-3-pentanone The N-arylpiperazines employed as starting materials can be prepared by any of the methods commonly employed in the art for the preparation of such compounds. One such method involves the reaction of a mixture of a suitably substituted aniline and diethanolamine, which mixture has been saturated with anhydrous hydrogen chloride gas. Heat is applied gradually until the temperature of the mixture reaches about 250° C., at which time the reaction mixture is poured onto ice and made strongly basic with sodium hydroxide, potassium hydroxide, or the like. The oil which separates is extracted with a suitable solvent such as, for example, chloroform or ether, and after evaporation of the solvent, the residual N-arylpiperazine is purified by distillation at reduced pressure.

The 2,4-(4-arylpiperazino)-3-pentanones of this invention, and the acid addition salts thereof, are extremely effective agents for treating schistosomiasis in animals such as mice, monkeys, and the like. Moreover, they are effective when administered by either oral or parenteral routes of administration. The compounds are employed for the control of schistosomiasis by administering to a parasitized host a therapeutically effective amount of the drug, usually between about 10 and about 1000 mg./kg. of host body weight per dose, preferably between about 50 and about 500 mg./kg. The compound can be administered in any of a variety of dosage forms, which may include the drug alone or in combination with a pharmaceutical excipient such as a solid or liquid diluent, buffer, binder, coating material, emulsifier, or the like.

The solid dosage forms are especially convenient to administer and may, in one embodiment of the invention, consist of the selected compound incorporated in a physiologically compatible excipient, for example, a component or combination of components of the diet of the host. Alternatively, the excipient can be any bland, non-irritating material which will be accepted by the host but which itself is not physiologically utilizable, as, for example an ion exchange resin or the like. Other solid dosage forms, such as tablets and/or filled capsules, comprising the antischistosomal agent and one or more of the commonly used diluents such as talc, lactose, starch, magnesium stearate, methylcellulose, or the like, can be employed with equally good results.

The general procedure employed in the preparation of the compounds of this invention is illustrated in the following example.

EXAMPLE 1

Preparation of 2,4-di[4-(3-chloro-4-methylphenyl)piperazino]-3-pentanone

To a solution of 42.0 g. of N-(3-chloro-4-methylphenyl)piperazine in 200 ml. of ethanol were added 25 g. of triethylamine. A solution of 24.4 g. of 2,4-dibromopentan-3-one in 100 ml. of ethanol was added dropwise with stirring. The reaction mixture was stirred for three days, diluted with an equal volume of water, and chilled until crystallization was effected. The resulting crystals were collected, washed with a small amount of methanol, and dried in vacuo to yield 10.0 g. of crude product, M.P., 130–150° C. The crude product was recrystallized twice from 1500 ml. of ethanol to yield 3.0 g. of 2,4-di-(4-[3-chloro-4-methylphenyl]piperazino)-3-pentanone as white granules, M.P. 160–163° C.

*Analysis.*—Calcd. for $C_{27}H_{36}N_4Cl_2O$ (percent): C, 64.40; H, 7.20; N, 11.13. Found (percent): C, 64.12; H, 7.24; N, 10.82.

I claim:

1. A compound selected from the group consisting of a compound of the formula

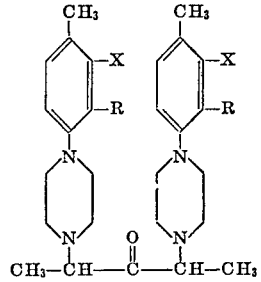

wherein X is halo, and R is hydrogen or methyl, and the pharmaceutically acceptable acid addition salt thereof.

References Cited

UNITED STATES PATENTS

| | | | |
|---|---|---|---|
| 3,203,858 | 8/1965 | Buting | 260—268 X |
| 3,379,620 | 4/1968 | Archen et al. | 260—268 X |

DONALD G. DAUS, Primary Examiner

U.S. Cl. X.R.

260—593 H